United States Patent
Giglia et al.

[11] Patent Number: 5,837,033
[45] Date of Patent: Nov. 17, 1998

[54] HOLLOW FIBER MEMBRANE SEPARATION APPARATUS

[75] Inventors: Salvatore Giglia, Norwood; Benjamin Bikson, Brookline, both of Mass.

[73] Assignee: Praxair Technology, Inc., Danbury, Conn.

[21] Appl. No.: 622,318

[22] Filed: Mar. 29, 1996

[51] Int. Cl.[6] .................................................. B01D 63/00
[52] U.S. Cl. .................. 95/45; 210/321.78; 210/321.79; 210/321.87; 210/321.88; 96/10
[58] Field of Search ............................ 210/497.1, 321.74, 210/321.78, 321.83, 321.87; 96/6–10; 95/43, 50, 45; 156/172

[56] References Cited

U.S. PATENT DOCUMENTS

| | | |
|---|---|---|
| 3,794,468 | 2/1974 | Leonard . |
| 3,870,637 | 3/1975 | Miyoshi et al. .......................... 210/243 |
| 4,061,574 | 12/1977 | Clark . |
| 4,207,192 | 6/1980 | Coplan et al. . |
| 4,368,124 | 1/1983 | Brumfield ................................ 156/172 |
| 4,572,446 | 2/1986 | Leonard et al. ......................... 242/7.02 |
| 4,652,373 | 3/1987 | Trimmer .............................. 210/321.87 |
| 4,660,779 | 4/1987 | Nemesi et al. ........................ 210/497.1 |
| 4,781,834 | 11/1988 | Sekino ................................. 210/321.88 |
| 4,812,184 | 3/1989 | CoPlan et al. ............................ 156/172 |
| 4,865,736 | 9/1989 | Coplan ................................ 210/321.79 |
| 4,881,955 | 11/1989 | Bikson et al. . |
| 4,975,247 | 12/1990 | Badolato et al. .................... 210/321.74 |
| 4,981,498 | 1/1991 | Bikson et al. . |
| 5,026,479 | 6/1991 | Bikson et al. ........................ 210/321.87 |
| 5,067,971 | 11/1991 | Birson et al. ................................ 95/52 |
| 5,160,042 | 11/1992 | Bikson et al. ......................... 210/321.8 |
| 5,215,661 | 6/1993 | Tanabe ................................ 210/497.01 |
| 5,217,689 | 6/1993 | Raible ................................. 210/321.83 |
| 5,263,982 | 11/1993 | Shimomura et al. ..................... 623/12 |
| 5,284,584 | 2/1994 | Huang et al. .......................... 210/321.6 |
| 5,299,749 | 4/1994 | Thorogood et al. .................. 210/497.1 |
| 5,411,662 | 5/1995 | Nicolas Jr. et al. .................. 210/321.8 |
| 5,462,619 | 10/1995 | Haworth et al. ......................... 156/172 |

FOREIGN PATENT DOCUMENTS

| | | |
|---|---|---|
| 0562520A1 | 9/1993 | European Pat. Off. . |
| 2641709 | 9/1976 | Germany . |
| 4129400 | 9/1991 | Germany . |

OTHER PUBLICATIONS

M.M. Schoppee, "Some Problems in Winding Geometry", *Journal of Engineering for Industry*, vol. 103, reprinted from Nov. 1981.

*Primary Examiner*—Ana Fortuna
*Attorney, Agent, or Firm*—Robert J. Follett

[57] ABSTRACT

The invention comprises an annular hollow fiber membrane module comprising a plurality of helically wound layers of semi-permeable hollow fibers, wherein the fiber wind angle varies across the axial length of the module in one or more layers. In a preferred embodiment, the module has at least one tubesheet region and an active region, and the wind angle in the tubesheet region of the module differs from the wind angle in the active region of the module. A method of making the module, and a separation module which includes the module described above is also disclosed.

15 Claims, 6 Drawing Sheets

HOLLOW FIBER MEMBRANE SEPARATION APPARATUS

FIELD OF THE INVENTION

This invention is directed towards improved hollow fiber membrane bundles used for the separation of a fluid component from a feed comprising a mixture of fluids. The term mixture of fluids refers to a mixture of liquids and/or a mixture of gases. Such uses include gas separation, reverse osmosis and ultrafiltration. Typical modules contain a single tubesheet, though the invention also contemplates modules which contain two tubesheets.

The invention is also directed towards an improved hollow fiber membrane separation apparatus which includes the improved module.

The invention is also directed towards methods for varying packing density and cross-sectional diameter along the length of a module.

BACKGROUND

The advantages of fluid separation hollow fiber devices prepared by helically winding hollow fibers are well known in the art. Preparation of such wound hollow fiber membrane devices are described in U.S. Pat. Nos. 3,794,468; 4,631,128; 4,865,736; 4,881,955, and 5,299,749.

U.S. Pat. No. 3,794,468 describes a mass transfer device wherein hollow fibers are wound about a core. Individual adjacent windings in the same layer are generally parallel to each other, but individual adjacent winds in adjacent layers define an angle with each other. In U.S. Pat. No. 4,631,128, a hollow fiber module device is disclosed in which the helical paths are arranged so that all fiber segments are nearly equal in length. A similar configuration is utilized in U.S. Pat. No. 4,865,736, but the wound hollow fibers are packaged in such a way that fluid flows parallel to the axis of the annular fiber module and no bypass of flow occurs along the fiber module/pressure shell interface. U.S. Pat. No. 4,881,955 reveals a hollow fiber permeator in which the feed gas is introduced into the bores of a helically wound membrane cartridge. This arrangement allows for superior separation efficiency. Finally, U.S. Pat. No. 5,299,749 relates to a hollow fiber module in which the filament segments in a layer all share the same helix angle and direction.

One of the critical parameters affecting module performance is fiber wind angle. The term "wind angle" is defined as follows: with a module in the horizontal position, the wind angle X is defined as the angle at which the fiber is laid across the module with respect to the vertical axis. Fibers wound at a 90° wind angle, for example, would be parallel and straight from end to end on the module. Fibers wound in a module at the same wind angle will have the same fiber length.

Low wind angles, herein defined as wind angles below 45°, are often preferred for a number of reasons. These include enhanced module structural integrity and less likelihood of flow maldistribution because of reduced opportunities for channeling and bypassing. By "channeling and bypassing" we mean the bypassing of a particular section of the membrane surface by the fluid, i.e., the fluid flows through the permeator module in a non-uniform flow giving rise to instances of high or low linear velocities and causing diminished module performance by reducing separation efficiency.

Another advantage of low wind angles is increased separation efficiency due to a more favorable contact angle between the shell-side fluid and the fiber (minimization of boundary layer effects). The use of low winding angles also allows for a slot-cutting method to be used to open the hollow fiber pores in the tubesheet. Slotted-cut tubesheets are particularly advantageous at high pressure loads, and the preparation thereof is described in U.S. Pat. No. 4,207,192.

The main disadvantage of low angle winding is the long fiber length. Longer fibers reduce separation efficiency because of bore-side pressure losses.

Haworth et al, in U.S. Pat. No. 5,462,619 teaches a hollow fiber module wherein the packing fraction varies in a radial direction. This is accomplished by changing the wind angle for each layer of fibers during winding.

In each of the cited patents, fiber wind angle was controlled by adjusting the ratio of traverse (fiber lay down) speed to spindle (module) rotation speed. This wind ratio was held constant for each stroke. A stroke is defined as the length of the module during traverse movement from end to end of the module. None of the earlier inventors contemplated a change in wind angle along the length of the module during individual strokes. Thus, a compromise had to be reached between the advantages and disadvantages of high and low angle winding.

SUMMARY OF THE INVENTION

The invention comprises an annular hollow fiber membrane module comprising a plurality of helically wound layers of semi-permeable hollow fibers wound on a cylindrical core pipe, wherein the fiber wind angle varies across the axial length of the module in one or more layers.

In one preferred embodiment, the module has at least one tubesheet region and an active region, and the wind angle in the tubesheet region of the module differs from the wind angle in the active region of the module.

In a preferred embodiment, the fiber wind angle is substantially the same in adjacent sections of successive layers across the radial diameter of the module.

In another preferred embodiment, not only does the fiber wind angle vary across the axial length of the module, but the distance between the fibers also changes such that the packing density of the fibers varies across said axial length.

In another preferred embodiment, a hollow fiber membrane module comprises a) an annular hollow fiber membrane module which comprises a plurality of helically wound layers of semi-permeable hollow fibers wound on a cylindrical core pipe, wherein the fiber wind angle varies across the axial length of the module in one or more layers; a fluid impermeable casing which encloses said module; a feed fluid entrance port; a permeate fluid exit port; and a non-permeate fluid exit port.

BRIEF DESCRIPTION OF THE DRAWINGS

Other features and advantages will occur to those skilled in the art from the following description of the preferred embodiments and accompanying drawings, in which.

DETAILED DESCRIPTION OF THE INVENTION

This invention provides a permeator that uses hollow fiber membrane bundles having open bores on one or both ends of the hollow fiber module. In using the permeator of this invention, a countercurrent flow, cross flow or cocurrent flow can be maintained between the feed and the permeate stream. For gas separation applications the countercurrent flow configuration is frequently the more desirable flow arrangement.

In a countercurrent flow arrangement, feed is introduced and flows along the membrane surface with raffinate withdrawn at the membrane module end, while the permeate, enriched with at least one more permeable gas component, flows countercurrently to the feed/raffinate flow direction. Methods to accomplish this are known and disclosed in U.S. Pat. Nos. 4,881,955 and 4,865,736.

The membrane module of this invention contains a center core tube, with hollow fibers wound in a cylindrical shape around the center core. Usually more than one hollow fiber is wound at a time with strands of 6 to 20 fibers frequently employed. The center core is a cylindrical hollow tube with openings or holes to permit flow of fluid between the exterior surface of the hollow fibers and the interior core of the center core tube. The size, location and number of these openings is dependent upon the flow pattern utilized, the size of the cartridge, and gas flow velocity on the shell side. The openings can be in the form of drilled holes, cut slots or other perforations. The cross-sectional area occupied by the holes is essentially determined by pressure drop requirements and preferably kept to acceptable minimum cross-section. The center core tube can be made from any non-permeable material, metal, glass, wood, plastic, composite laminate, and the like.

The methods by which hollow fibers are wound around a cylindrical center core mandrel are well established in the art, as are the methods and materials used to form tubesheets and methods to sever the tubesheets to expose hollow fiber bores. In one approach, the hollow fibers are severed by cutting slots or notches in the tubesheets. In another approach, the tubesheets can be severed by creating a flat surface by techniques known in the art and then supported with a porous plate or other means.

The critical feature of this invention is that the fiber wind angle is varied during deposition of a single stroke from one end of the module to the other to achieve an optimum wind angle condition. In general, wind angles above 45 degrees are considered to be high, while wind angles below 45 degrees are considered to be low.

For example, a separation application with high differential pressure across the membrane may favor the use of a high wind angle in the active region of the module for optimum separation efficiency. Such applications include $CO_2$ gas separation from natural gas streams or the separation of $H_2$ from hydrogen-containing streams in refineries or in an ammonia synthesis process wherein the cross-membrane differential pressure ranges from 400–2000 psig. The active region is defined as the region where the active fluid separation takes place.

In contrast, a low wind angle is required in the tubesheet region in order to utilize the high-pressure capable slot-cut or drill bored tubesheet design arrangement such as that disclosed in U.S. Pat. No. 4,207,192, and U.S. Pat. No. 4,061,574, respectively. In this case, the fiber wind angle (controlled by the wind ratio) would change from a high to a low value at the fiber-tubesheet interface region.

In some separation applications, the fluid separation conditions may favor a low wind angle in the active region of the module and a high wind angle in the tubesheet region. In such an application a flat-cut tubesheet arrangement is advantageously utilized, wherein the bottom face is severed flat to expose and open all of the encapsulated fibers. This flat-cut tubesheet arrangement would be advantageous if the differential pressures across the tubesheet are low (typically less than 400 psig). In such a case, by increasing the wind angle in the potted section bore-side pressure losses across the tubesheet are significantly reduced. In contrast to the first example, the wind angle would change from high to a low value at the fiber-tubesheet interface region.

The variable wind angle can be further advantageous in high recovery axial flow embodiments and high stage cut conditions (recovery of at least 60–95%) wherein the flow velocity changes rapidly along the length of the module. A high recovery, i.e., high stage cut, fluid separation application can substantially benefit from a variable packing density configuration. By the term "stage cut" we mean the mole ratio of permeate gas to that of the fluid feed mixture. As the flow velocity and composition of the bore and shell-side fluids change, the optimum contact angle with the fiber (e.g. the best angle for mass transfer) may also change. In this situation, a gradual variation in fiber wind angle from one end of the module to the other may be beneficial.

Another important hollow fiber module characteristic is fiber packing density. High packing density (greater than 50%) offers the advantages of high area packing efficiency and improved flow distribution through the module. However, shell side fluid pressure drop increases with increased packing density. A high pressure drop may be undesirable from a process point of view and could also result in module damage.

The present invention provides control of packing density along the length of the module by means of fiber placement (e.g. wind ratio) and thus control for optimal flow dynamics in an axial flow configuration. An "axial flow configuration" is one wherein the flow of the feed fluid is parallel to the fiber direction, and the flow of the permeate gas is parallel to the axis that follows the feed gas entrance and raffinate exit ports.

A variable packing density module can allow for low pressure drop in the high velocity regions of the module while simultaneously maximizing packing density and flow distribution efficiency in the low velocity sections of the module. Control of the packing density distribution can also allow for a more efficient routing and distribution of the shell side fluid throughout the module.

The feed fluid velocity of an axial shell side feed module in the entrance region is higher than the exiting region, thus a low packing density (less than 50%) would be optimum for this region. However, a gradual increase in packing density may be advantageous for the module section distal from the entrance region. In such embodiments the module is wound in such a way that the distance between successive parallel filaments decreases from the feed end of the module to the retentate end of the module.

Commercially available winding apparatus are available for wrapping the hollow fiber membranes of the invention. CMC of Salt Lake City, Utah offers such an apparatus with electronic gearing for varying the rotational speed of the module and the traverse speed during winding.

Figure 1:
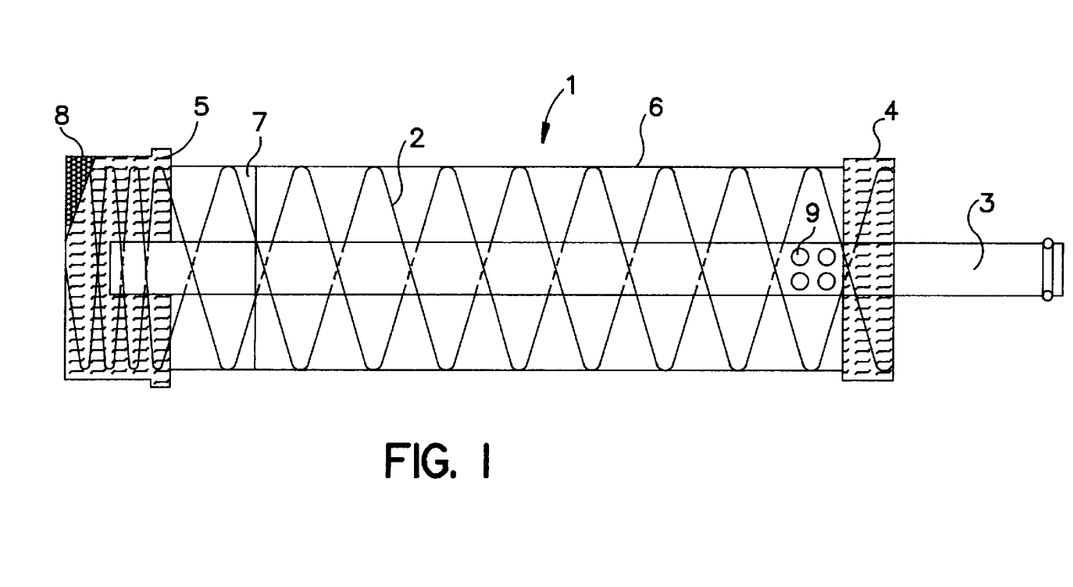
FIG. 1 is a schematic diagram of a module according to one embodiment of the invention wherein the fiber wind angle of the potted end section is lower than the fiber wind angle of the active region, and the potted end is severed at an angle.
Figure 1A:
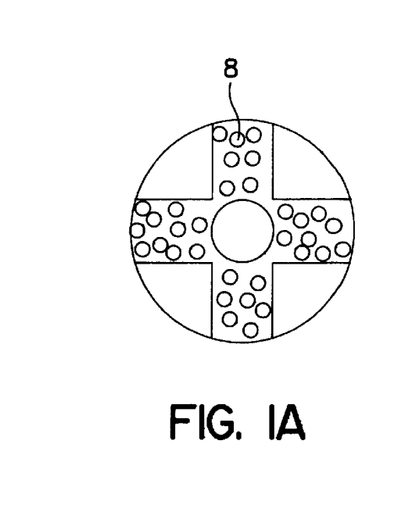
FIG. 1A is view of the module of FIG. 1 as viewed from the potted end.

A module constructed in accordance with the teachings of this invention is shown in FIG. 1. An annular-shaped hollow fiber module 1 is formed by winding individual fibers 2 in helical winds about a central mandrel 3 having perforations 9 therein. A potting material, such as epoxy resin, is used to encapsulate the cap end of the module 4 and the pot end of the module 5. The fiber module is encased by a barrier 6, which is substantially impermeable to feed fluid, except for open surface region 7. The use of such an impermeable barrier 6 is known in the art as shown in U.S. Pat. Nos. 4,781,834 and 4,865,736, the latter of which is herein incorporated by reference. Fiber bore openings are created by cutting slots in the potting material indicated at 8. FIG. 1A shows a view of the module of FIG. 1 as viewed from the potted end. As shown in FIG. 1, the wind angle in the potted end is lower than the wind angle in the unpotted section of the module.

The fiber wind angle in the tubesheet region of the module is different from that in the active region of the module. Low wind angles facilitate opening of the fibers in the slotted tubesheet because the minimum slot height required to intercept and open hollow fibers decreases with decreasing wind angle. A low wind angle in the slotted tubesheet section is therefore advantageous because the potted height of the module is minimized.

The change in winding angle can lead to a change in the packing density in different sections of the module. Thus, the packing density of hollow fibers in the active region and the potted region may differ from each other. In some embodiments wherein the packing density is high, the module diameter may change from one section to another. Note that the embodiments shown in FIGS. 1–4 and 6 show modules having a constant diameter.

Figure 2:
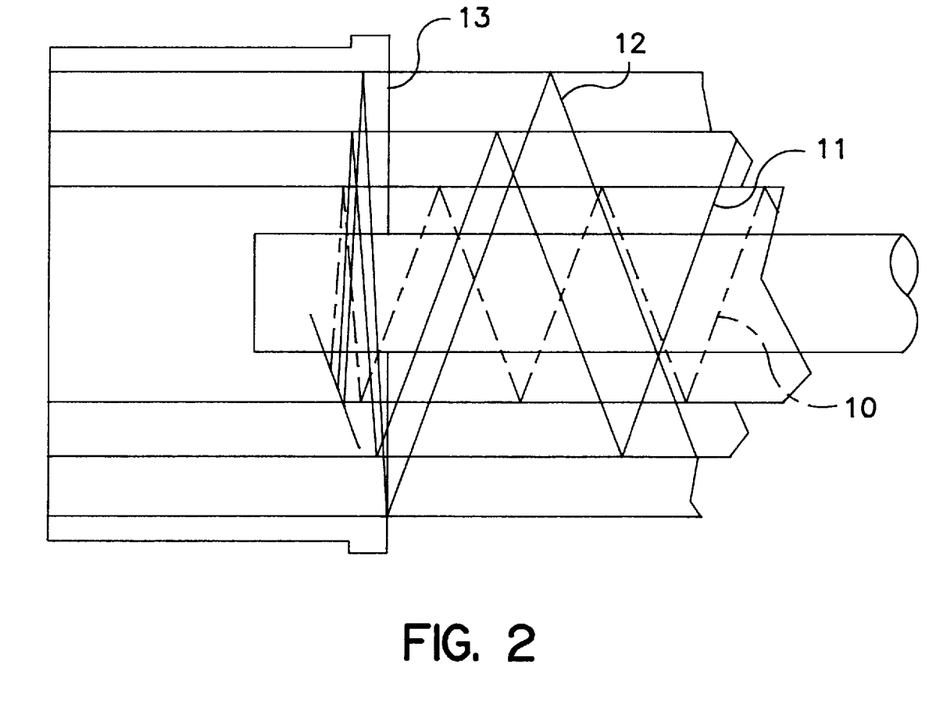
FIG. 2 is a schematic diagram which shows how the fiber wind angle remains constant in each fiber layer across the module diameter.

The hollow fiber wind angle in the corresponding active module section and tubesheet section is preferably held essentially constant in each fiber layer throughout the module diameter, as illustrated in FIG. 2. Inner, intermediate and outer annular hollow fiber wraps are indicated by numbers 10, 11 and 12, respectively. Although the fiber wind angle changes from a higher value to a lower value at the potted-unpotted interface 13, the fibers at any given distance along the length of the module are essentially parallel to each other in the radial (central mandrel outward) direction (e.g. angles of the fibers 10, 11 and 12 are the same).

Figure 3:
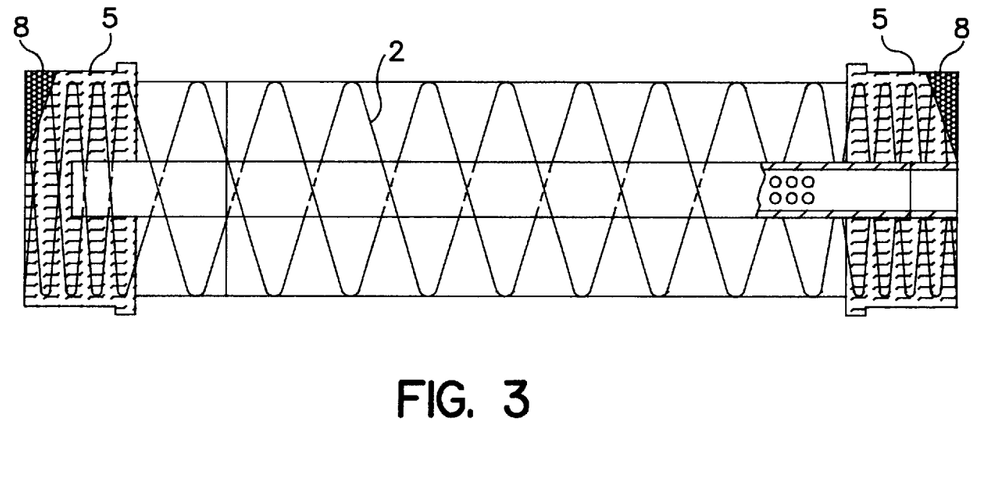
FIG. 3 is a schematic diagram of a second embodiment of the invention which is a module containing two tubesheets.

Variable angle winding can be also employed in bundles that contain two tubesheets, i.e., bundles that are potted and slot cut at both ends to allow for permeate removal from both ends or to introduce feed/sweep fluids into the fiber bores, as shown in FIG. 3. The fibers 2 are wound at a low angle in the potted ends 5 but at a higher angle in the unpotted (active) region in between tubesheets. Here again, lower wind angles in the potted sections allow for intersection and opening of the fiber by cutting slots 8 into the potting material in the most effective manner. The module of FIG. 3 may be placed in a housing containing four ports: one port for the introduction of feed fluid; a second port for removal of non-permeate fluid; a third port for the introduction of a sweep fluid; and a fourth port for the removal of sweep and permeate fluids. Such arrangements are disclosed in U.S. Pat. No. 4,981,498, the contents of which are herein incorporated by reference.

Figures 4, 4A:
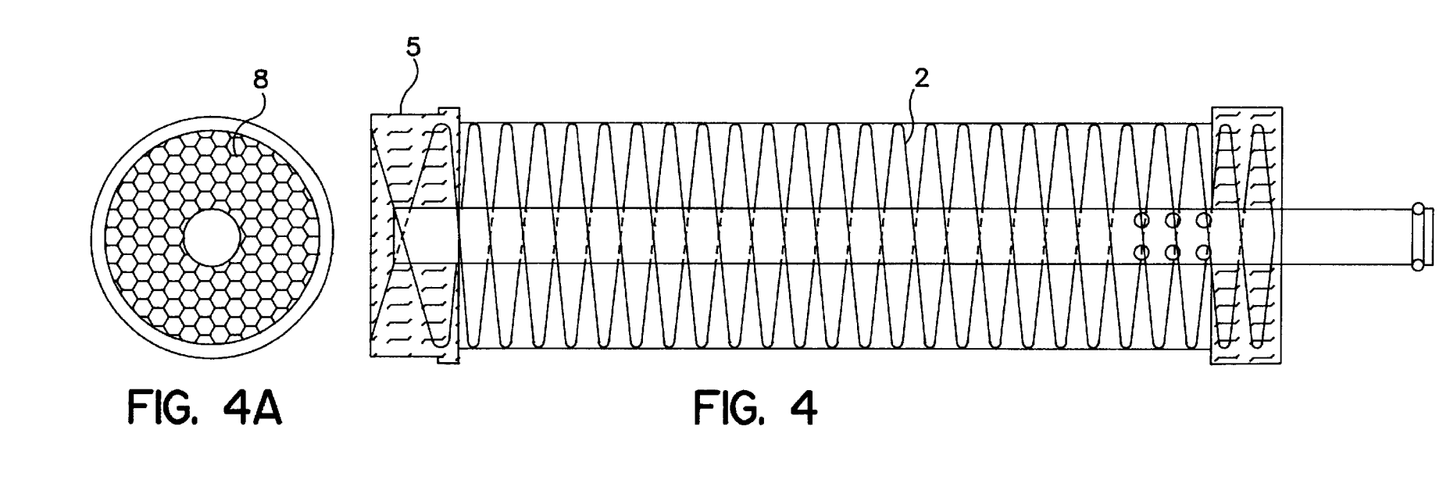
FIG. 4 is a schematic diagram of a third embodiment of the invention wherein the fiber wind angle of the potted end is lower than the fiber wind angle of the active region and the potted end is severed flat.
FIG. 4A is a view of the module of FIG. 4 as viewed from the potted end.

In an alternative embodiment, illustrated in FIG. 4, the fiber 2 is wound at a higher angle in the potted tubesheet region 5 and at a lower angle in the active (unpotted) region. The potted end in this case is severed flat, exposing the open fibers 8 as shown in FIG. 4A which is a view of the module shown in FIG. 4 as viewed from the potted end. Here, all of the fibers in the potted section are exposed on the bottom face of the pot regardless of wind angle. Maximizing the wind angle in the potted region is beneficial because it allows for the minimization of bore-side pressure losses in the tubesheet.

In addition to varying wind angle along the length of the module, in some embodiments it may be desirable to change the distance between successively deposited hollow fibers in the same layer. In many embodiments, it is advantageous that the length of the hollow fibers throughout the layers vary from one another by less than about 10%, preferably less than 5%.

Figure 5:
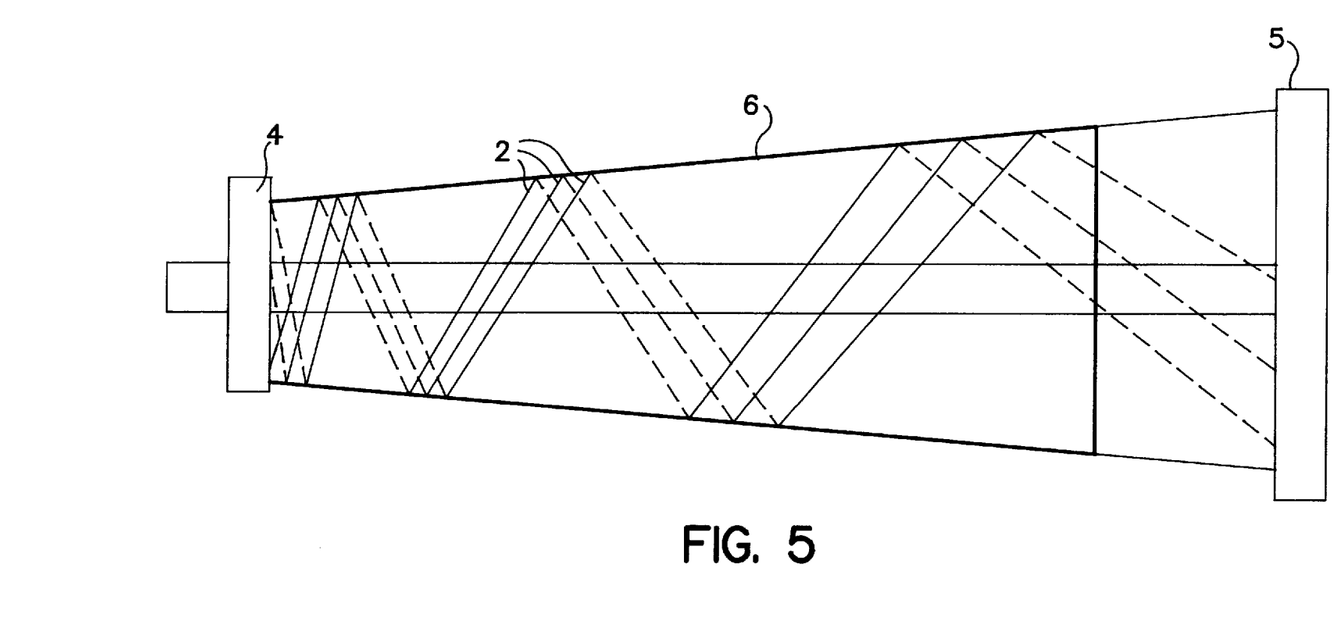
FIG. 5 is a schematic diagram of a fourth embodiment of the invention wherein the packing density and cross-sectional diameter are varied along the length of the module.

Another embodiment of the present invention provides an axial flow hollow fiber membrane module wherein the packing density and cross-sectional diameter is varied along the length of the module. Such a variable packing density module is illustrated in FIG. 5. In this embodiment in addition to changing fiber angle, the distance between successive fibers 2 decreases from the pot end 5 of the module to the cap end 4. This results in an increase in packing density from the pot end 5 to the cap end 4. An impermeable barrier film 6 is placed around the body of the hollow fiber module except for a narrow circumferential region adjacent to the potted end 5. The use of such a barrier film in the above embodiment is particularly advantageous because it allows for a mode of feed flow which is in bulk co- or counter-current to the flow of permeate in the hollow fibers. In order to achieve such a flow, the bulk feed flow must be directed generally in line with the central axis of the module. The use of the impermeable barrier film accomplishes this result and avoids channeling, bypassing and other flow inefficiencies. Such a benefit has not heretofore been recognized with axial flow modules of variable packing density design.

In the embodiment shown, the permeate is removed only from one end of the module, the feed flow arrangement is axial, and the retentate is removed through holes in the mandrel (not shown) that is similar to the arrangement in FIG. 1. Preferably the lengths of the hollow fibers throughout the layers vary from one another by less than about 10%, preferably less than 5%.

Figure 6:
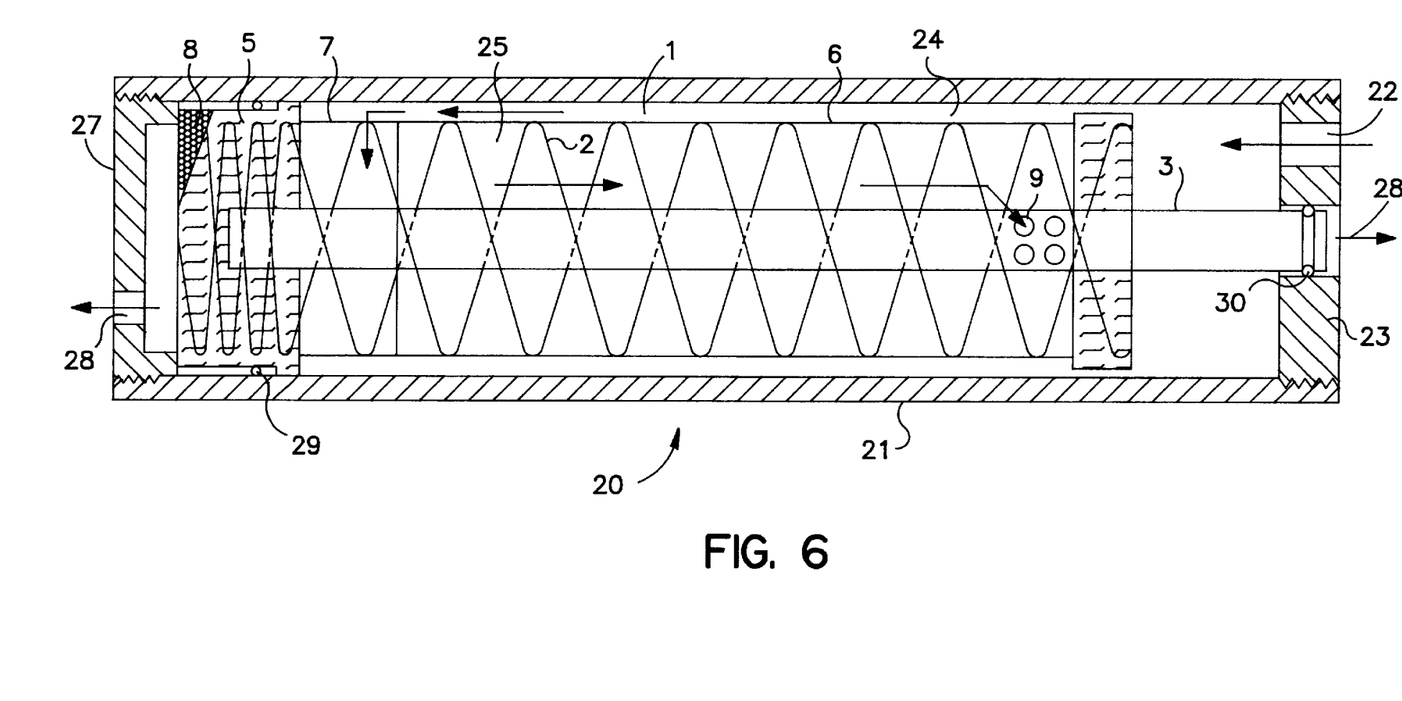
FIG. 6 is a schematic diagram of a fluid separation apparatus containing a hollow fiber membrane module wherein the fiber wind angle of the potted end of the module is lower than the fiber wind angle of the active region.

The hollow fiber modules of this invention, shown in FIGS. 1, 4 and 5, can be successfully employed for a variety of fluid separation applications, in particular gas separations, when incorporated into a fluid separation apparatus such as that depicted in FIG. 6. The hollow fiber separatory apparatus 20 (shown in FIG. 6) is comprised of a membrane element 1 that is contained within a pressure vessel 21. Pressurized fluid is fed into access port 22 of end closure 23. The fluid then passes into channel 24 between the inside surface of pressure vessel 21 and impervious barrier 6 placed around the module, and then into the circumferentially unencased region of the module 7. At this point, the pressurized feed travels through the fiber module in a direction generally parallel to the central mandrel 3. More permeable components of the feed stream pass across the hollow fiber walls, and the permeate stream is then transported across tubesheet 5 to permeate outlet port 26 of pot-side end closure 27. The raffinate/nonpermeate portion of the feed stream passes into the hollow central mandrel 3 via openings 9 and out through the exit port 28 of cap-side end closure 23. "O"-ring 29 provides a fluid-tight seal between tubesheet 5 and the inside of the pressure vessel 21. Another "O"-ring 30 provide a fluid-tight seal between cap-end closure 23 and central mandrel 3. The fibers 2 (only a single fiber is shown) are wound at a high angle (preferably in the range of 45° to 60°) in the active region of the module and at a low angle (preferably in the range 10°to 30°) in the tubesheet potted region of the module. The low wind angle in the potted region allows for intersection of all the fibers in the module by means of cutting slots 8 in the tubesheet 5.

Hollow fibers to be utilized in the hollow fiber membrane module fluids separations device of this invention depend upon the particular separation process to be undertaken. Their preparation and their compositions are well known to those of ordinary skill in the art. One can use either a dense wall, porous, asymmetric or composite membrane in constructing hollow fiber membrane fluid separation apparatus of this invention.

The production of permeable hollow fibers and the materials used for their production are well known. Such hollow fibers are readily produced by the procedure described by I. Cabasso, "Hollow Fiber Membranes", Kirk-Othmer: Enc. of Chem. Tech., 12, Third Ed., 492–517 (1980) and I. Cabasso, "Membranes". Enc. of Pol. Sc. & Eng., 9, Second Ed., 509–579 (1987). Depending upon the intended use (e.g., gas separation, liquid based separations such as microfiltration, ultra-filtration, etc.) one selects hollow fibers having the appropriate morphology, chemical structure, dimensions and pore diameter sizes.

Advantageously the walls of the hollow fibers are sufficiently thick so that no special apparatus would be required for their handling. The outside diameter of the hollow fiber can vary from about 1 mil or less to about 100 mils or more, preferably from about 2 mils to about 80 mils. The wall thickness of the hollow fiber can vary from about 0.1 mil to about 12 mils or more, preferably at least about 0.2 mil up to about 20 mils.

In many instances the hollow fiber is in the form of a composite membrane with a thin membrane-forming material applied to the surface of the porous hollow fiber. These can be produced by any of the known procedures, e.g., as shown in U.S. Pat. No. 4,467,001, wherein the solution of the membrane-forming material is applied to deposit a finished dry coating up to about 7,000 Angstroms, preferably from about 500 to about 2,000 Angstroms adhered to the exterior surface of the porous hollow fiber.

The hollow fiber fluids separation module and the permeator apparatus of this invention are used for separating and enriching a first component from a fluids mixture thereof with at least one other component of said mixture. Among typical multicomponent gas mixtures that can be separated with the bundles and apparatus of this invention one can mention $He/N_2$, $CO_2/CH_4$, $He/CH_4$, $O_2/N_2$, $H_2/CO_2/CO/N_2$, $CH_4/CO_2/H_2S$, $CO/H_2$, $H_2/CH_4$, $He/CH_4/N_2$, $He/O_2/N_2$, $N_2/H_2$, $N_2/CH_4$, $H_2O/O_2/N_2$; also included are many other compositions known to those skilled in the art as being capable of being separated by membrane permeation techniques.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. An annular fluid separation hollow fiber membrane module comprising a plurality of helically wound layers of semi-permeable hollow fibers wound on a cylindrical core pipe, wherein the fiber wind angle varies along the axial length of the module in one or more layers, and wherein the diameter of the plurality of helically wound layers of semi-permeable hollow fibers wound on said cylindrical core pipe is constant along the axial length of the module.

2. The annular fluid separation hollow fiber membrane module of claim 1, wherein the fiber wind angle varies along the axial length of the module in all of the layers.

3. The annular fluid separation hollow fiber membrane module of claim 1, wherein the length of the hollow fibers throughout the layers of said wound module vary from one another by less than about 10%.

4. The annular fluid separation hollow fiber membrane module of claim 1, wherein the hollow fiber wind angle is substantially the same in adjacent sections of successive layers across the radial diameter of the module.

5. The annular fluid separation hollow fiber membrane module of claim 1, wherein the distance between the hollow fibers changes along the axial length of the module.

6. The annular fluid separation hollow fiber membrane module of claim 5, wherein the packing density changes along said axial length.

7. The annular fluid separation hollow fiber membrane module of claim 1, wherein said module further comprises at least one tubesheet region and an active region, and wherein the wind angle in the tubesheet region of the module is different than the wind angle in the active region of the module.

8. The annular fluid separation hollow fiber membrane module of claim 1 having first and second ends and, wherein said module is enclosed in a closely conforming barrier material which is impermeable to said fluid and extends over the entirety of said module except for a non-wrapped circumferential region adjacent to said first end of said module.

9. A process for separating a mixture of gases into its components, said process comprising contacting said gas mixture with an annular fluid separation hollow fiber membrane module having a plurality of helically wound layers of semi-permeable hollow fibers wound on a cylindrical core pipe, said module having at least one tubesheet region and an active region, wherein the fiber wind angle varies along the axial length of the module in one or more layers, and wherein the diameter of the plurality of helically wound layers of semi-permeable hollow fibers wound on said cylindrical core pipe is constant along its axial length.

10. An annular fluid separation hollow fiber membrane module comprising a plurality of helically wound layers of semi-permeable hollow fibers wound on a cylindrical core pipe, wherein the fiber wind angle varies along the axial length of the module in one or more layers, said module has an active region comprising both a feed entrance region and a retentate exit region, and the flow configuration of the membrane is axial, and wherein the packing density is varied between said feed entrance region and said retentate exit region along said axial length.

11. The annular fluid separation hollow fiber membrane module of claim 10, wherein the packing density at said feed entrance region is less than the packing density of said retentate exit region.

12. An annular fluid separation hollow fiber membrane module comprising a plurality of helically wound layers of semi-permeable hollow fibers wound on a cylindrical core pipe and having an active region, wherein the fiber wind angle varies along the axial length of the module in one or more layers, and wherein the diameter of the plurality of helically wound layers of semi-permeable hollow fibers wound on said cylindrical core pipe changes in the active region; and
wherein the distance between the hollow fibers changes along the axial length of the module.

13. The annular fluid separation hollow fiber membrane module of claim 12, wherein said module further comprises at least one tubesheet region, and wherein the diameter of the fiber-wound core pipe changes within said tubesheet region.

14. The annular fluid separation hollow fiber membrane module of claim 12, wherein the length of the hollow fibers throughout the layers of said wound module vary from one another by less than about 10%.

15. The annular fluid separation hollow fiber membrane module of claim 12, wherein the packing density changes along said axial length.

* * * * *